UNITED STATES PATENT OFFICE.

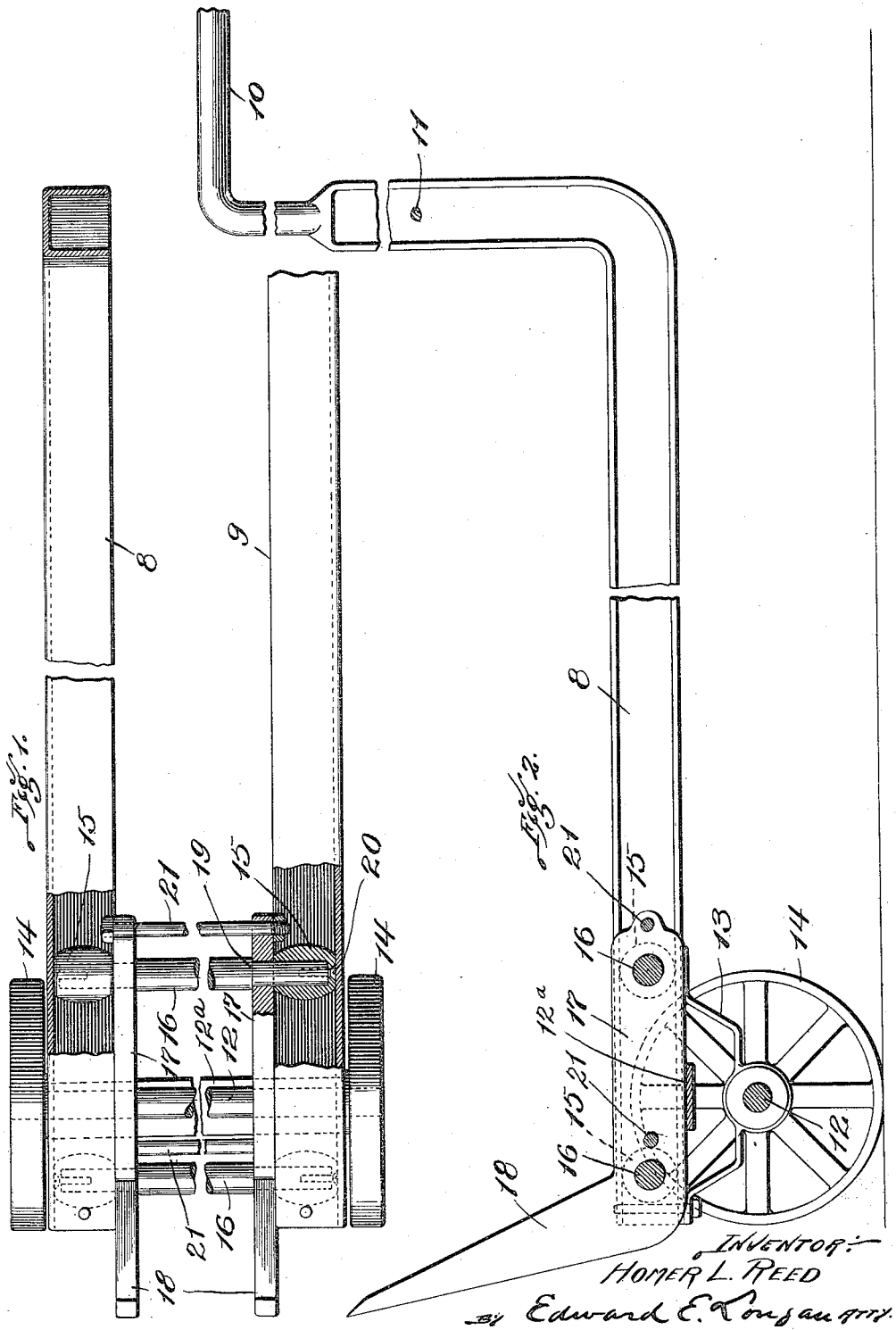

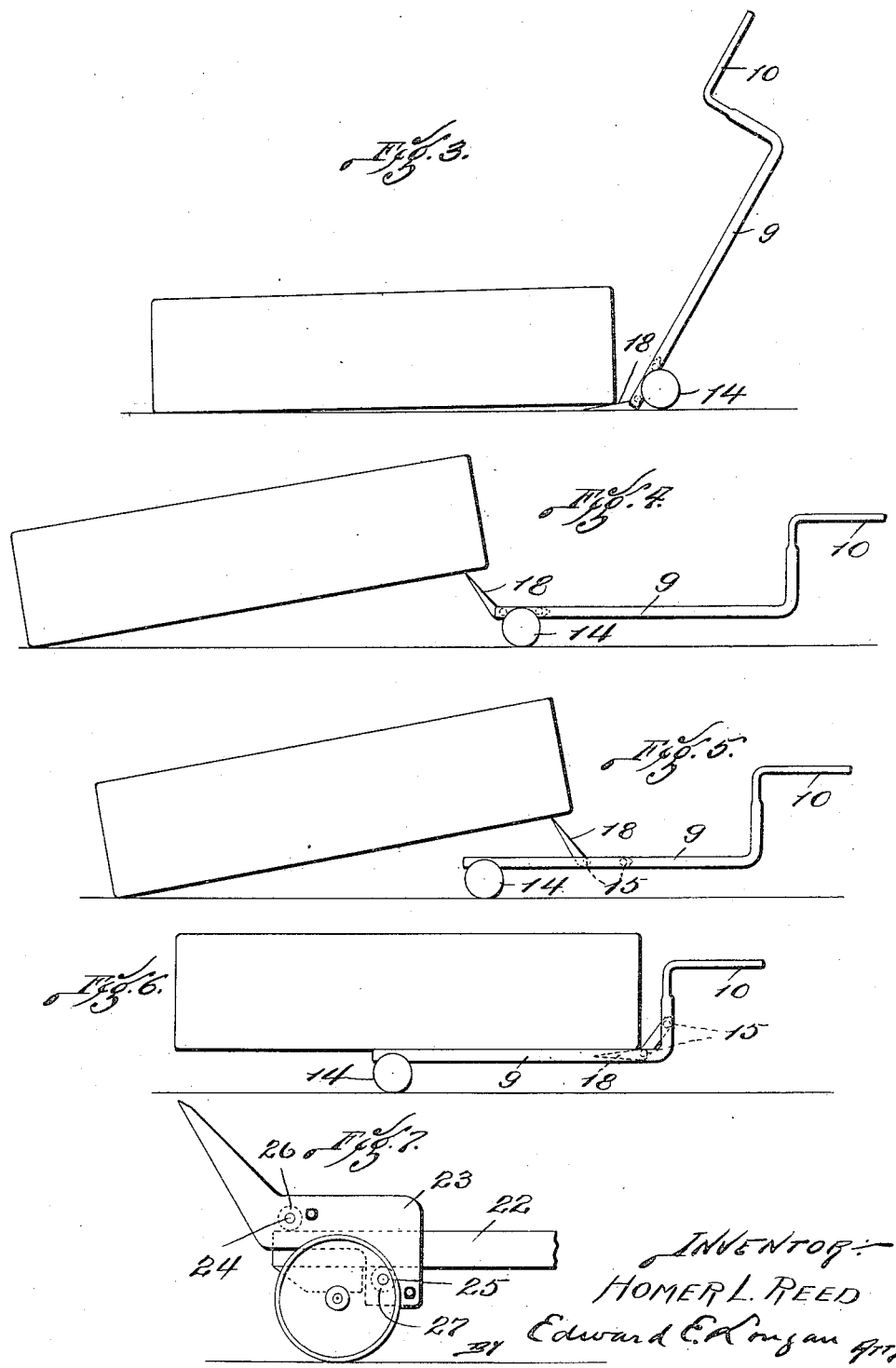

HOMER L. REED, OF LOUISIANA, MISSOURI.

TRUCK.

1,225,859.

Specification of Letters Patent.

Patented May 15, 1917.

Application filed May 12, 1916. Serial No. 97,056.

*To all whom it may concern:*

Be it known that I, HOMER L. REED, a citizen of the United States, and resident of Louisiana, Missouri, have invented certain new and useful Improvements in Trucks, of which the following is a specification, containing a full, clear, and exact description, reference being had to the accompanying drawings, forming a part hereof.

My invention relates to improvements in trucks, and is especially directed to the hand operated variety for use in the connection of handling freight, especially boxes.

The object of my invention is to construct a simple and durable truck having a wheeled body on which there is mounted a carriage movable lengthwise of the body on which carriage there is a point or truck head which, when the entire body is tilted upwardly over its wheels, may be "nosed" under a box and arranged to lift the box so that when the truck body is brought to a substantially horizontal carrying position, the truck may be shoved under the box, the carriage with the box lifting points automatically moving rearwardly of the truck body and then automatically "dumped" to bring one half of the box length to lie upon the full length of the truck body.

With the above object in view my invention consists in the novel construction and arrangement of parts which will be hereinafter fully, clearly and concisely described, pointed out in my claims and illustrated by the accompanying drawings, in which—

Figure 1 is a fragmental plan partly in section of the wheeled end of the truck body and the carriage movable with relation to the truck body;

Fig. 2 is a longitudinal sectional elevation, with certain parts broken away, of the truck;

Fig. 3 is a diagrammatical elevation showing the truck and the carriage thereon in the first position for loading a box, the truck body being tilted upwardly;

Fig. 4 is a view similar to Fig. 3 showing the truck body in a carrying position with the box lifted at its one end by the carriage points or truck head;

Fig. 5 is a view similar to Figs. 3 and 4 showing the truck as partially shoved under the box and the carriage moved from its first position rearwardly along the truck body;

Fig. 6 is a similar view to Figs. 3, 4 and 5 showing the carriage at its rearmost position with its points out of engagement with the box as when "dumped", for carrying and Fig. 7 is a view showing a modified form of truck body and carriage.

Referring by numerals to the accompanying drawings, 8 and 9 designate channel irons which are substantially U-shaped, in cross section and generally of L-shape, the long arms of which L-shaped channel irons constitute the main body portion of the truck frame and the short arms of which constitute the rear end of the body portion. Connected with each of the short arms of the said L-shaped truck frame bodies is a handle 10 which is preferably of cylindrical tube formation.

In order to hold the channels 8 and 9 in parallelism the rear short arms thereof are connected by a bolt 11 and the front ends of said truck bodies 8 and 9 are held against relative lateral movements by means of an axle 12 rotatably supported in brackets 13 secured underneath the forward end of the long arms of the L-shaped channel irons 8 and 9, as well as by the cross brace 12$^a$.

Rotatably mounted on the axle 12 outside of each frame member or channel iron 8 and 9, is a wheel 14.

It is to be observed that the open sides of the channel irons 8 and 9 face inwardly, that is toward each other to provide track ways for rollers 15 rotatably mounted on shafts 16 constituting a support for a carriage frame 17 comprising two parallel members having at their free ends upturned points 18, the frame of the carriage being disposed parallel with the channel irons 8 and 9, and the points 18 or truck head disposed at an angle relative to the body portions of the carriage and in a direction upwardly and forwardly relative to the truck.

By preference each of the shafts 16 is shouldered as at 19 and the carriage bodies 17 are placed over the shafts and rested against said shoulders, the rollers 15 being placed over the shaft outside of said frame bodies and held in place by set screws 20 seated in the ends of the shaft 16.

In order to more firmly secure the bodies 17 against lateral displacements, I provide a connecting bolt 21 therefor to the rear of each of the rollers 15.

In order to permit the rollers 15 to move from the long arm of the channel irons 8 and 9 to the short arms thereof, the connection between the two arms is arcuated as clearly shown in Fig. 2.

By the arrangement of elements as just described and as clearly shown in the drawings, it is to be understood that I have provided a truck in which the head or points may be moved lengthwise relative to the truck body, and further that the truck head may be tilted when it rides the rearmost end of the truck frame, whereby to automatically and gradually lower a box carried by the truck head or carriage, to the body of the truck.

In the modified form shown in Fig. 7 I have shown the truck body 22 to be a plane solid body of one-piece structure instead of the spaced channel irons as shown in Figs. 1 and 2.

In this form of truck I employ the spaced carriage frame members 23 between which there are extended the shafts 24 and 25, the shaft 24 being disposed above the body 22 and carrying rollers 26 for rolling upon the upper face of the body 22, and the shaft 25 carrying rollers 27 which roll on the underneath face of the body 22.

In the practical operation of my improved truck, assuming the carriage to be at the forward end of the wheel truck frame, the entire truck frame is tilted as shown in Fig. 3 whereby the points or truck head will be brought to the ground or floor in a position to be "nosed" under the box to be lifted as clearly shown in Fig. 3.

By moving the truck frame or body to a substantially horizontal or carrying position, it will be observed that the truck head or points will lift the one end of the box and it is to be noted here that in order that the entire truck frame may be shoved under the box to a little more than one-half the length of the box, the points 18 or truck head must be of a length or height equaling the height of the truck frame from the ground.

In Fig. 4 the truck is shown in a position lifting one end of the box. In Fig. 5 the truck is shown as being partially shoved under the box, and in Fig. 6 the box is shown as being seated squarely upon the truck body, that is the tops of the channel irons with the truck points substantially parallel with the channel irons and removed from engagement with the box. This tilting, or movement of the truck head or points 18 from engagement with the box, is wholly automatic for the reason that when the truck is shoved under the box, the carriage is moved to the rear of the truck, and its rearmost rollers 15 ride up the short arms of the channel irons, while the foremost rollers 15 of the carriage remain in the long horizontal arms of the channel irons as clearly shown by Fig. 6.

In unloading, I take advantage of the tilting carriage by depressing the entire carriage frame at its rear end downwardly and forwardly, (the operator of the truck in this last mentioned movement usually places his foot upon the bolt 21 and exerts pressure downwardly and forwardly thereon to effect the movement of the carriage to tilt it to again lift the rearmost end of the box), the carriage thus being supported solely in the long or horizontal arms of the channel irons again tilts the box so that the entire truck may be pulled from underneath the same.

It will thus be observed that with such a truck a single operator may handle a much heavier box than would be possible with a truck not provided with a carriage movable with relation to the truck body, as contemplated by the applicant herein.

Having thus described my invention what I claim as new therein and desire to secure by Letters-Patent of the United States, therefore is:

1. In combination with a wheeled truck frame, comprising channels bent at an angle at their rearmost ends, a carriage frame having rollers arranged for movement in said channels, a truck head movable with said carriage and disposed at an angle relative to the body of said carriage whereby to elevate one end of a box or the like, so that the entire truck may be moved to underlie the major portion of the box and to automatically lower the elevated end of the box to lie upon the body of the truck.

2. In combination with a truck body having next its rearmost end an angularly disposed portion and a wheeled support next its forward end, a carriage mounted for movements along the said body and its angular portion, said carriage comprising a truck head inclining forwardly and upwardly relative to the carriage body, said truck head arranged to be moved into and out of the plane of said body portion by a movement of the carriage relative to said body and its angular portion.

3. In combination with a truck frame comprising parallel channeled elements having angular portions at their rearmost ends and a wheeled support adjacent their forward ends, a carriage having rollers arranged for movements in said channeled elements, and a forwardly and upwardly inclined truck head carried by said carriage.

In testimony whereof I have signed my name to this specification in presence of two subscribing witnesses.

HOMER L. REED.

Witnesses:
S. O. MARSH,
S. J. HEATON.